July 10, 1956   G. I. FREDRIKSON   2,753,982
SLIDABLE LINK CHAINS AND COVEYORS EMPLOYING SUCH CHAINS
Filed Jan. 29, 1953
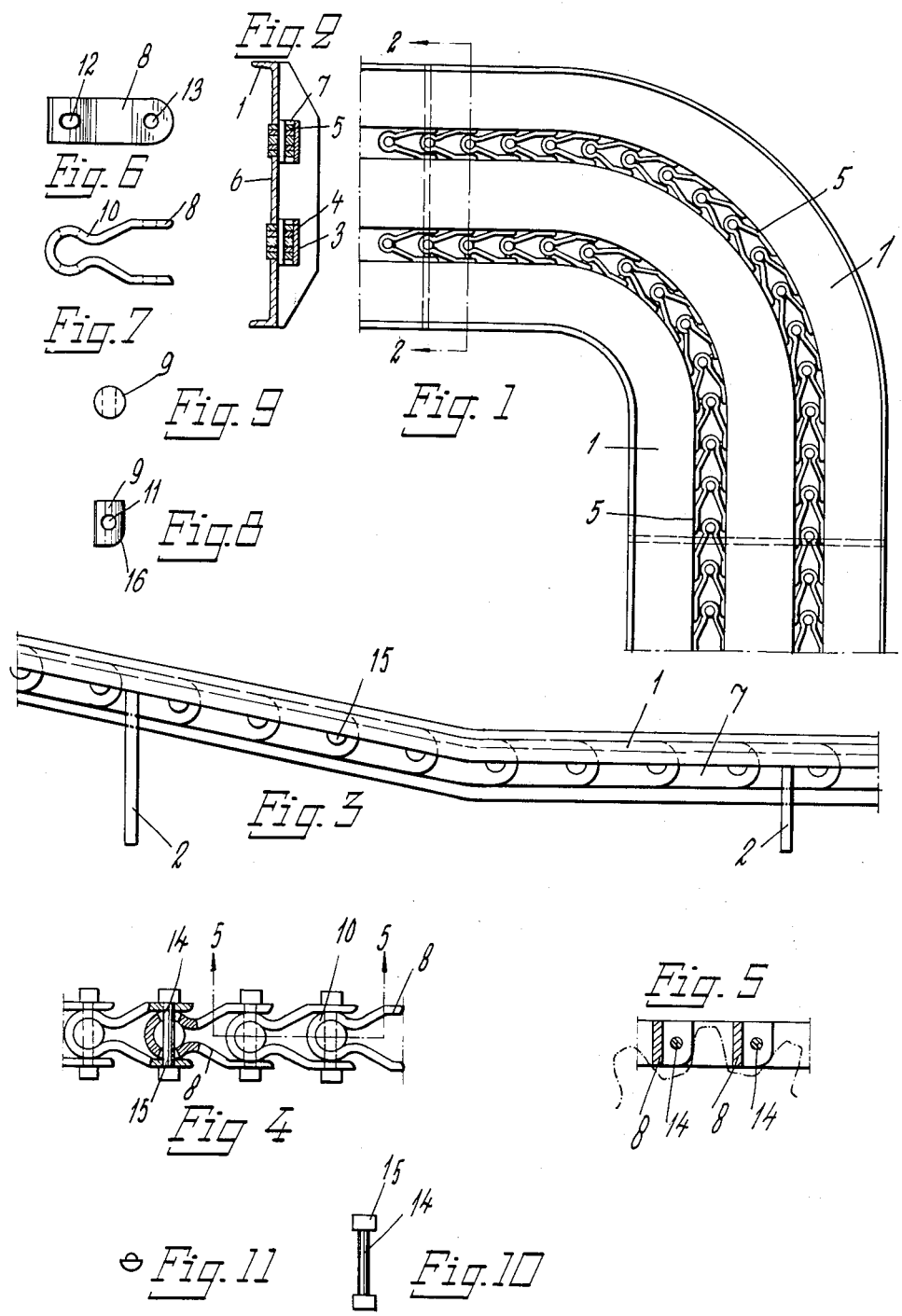

United States Patent Office 2,753,982
Patented July 10, 1956

2,753,982

SLIDABLE LINK CHAINS AND CONVEYORS EMPLOYING SUCH CHAINS

Gustav Ivar Fredrikson, Vadstena, Sweden

Application January 29, 1953, Serial No. 333,879

3 Claims. (Cl. 198—189)

The present invention relates to a guidable link chain of the kind wherein the links are mutually connected by means of two articulations being preferably bendable in planes at right angles to each other, the one end of each link being open and embracing the closed end of the adjacent link.

Belt-conveyors often have to be formed in curves or bends in different planes so as to form both vertical and horizontal curves to be adapted to different applications or to suit especial technical purposes. In conveyors used e. g. in dairies for transporting cans, barrels etc. and baskets for bottles, the conveyor belt should further be slippable, that is the top side of the conveyor belt should be so plane that if the goods transported are getting stopped for some reason or other the belt is permitted to continue traveling while the goods remain stationary.

Chain-conveyors having a slippable conveyor belt are commonly known having a conveyor belt comprising two or more chain cords consisting of so called bolted chain, in which the different links are mutually articulatedly connected by means of bolts. Such a chain, however, in a theoretical aspect, lends itself to be bent merely in one plane. In order to provide for at least a certain bendability in another plane the bolt has been given a play in certain chain conveyors. When the chain conveyor is to be passed in horizontal curves the radius or curvature will be too large, due to the limited bendability of the chain in the horizontal plane on horizontal bolts. Such a conveyor could not commonly be bent to form concave curves in the vertical plane due to the fact that the chain in such a case would be lifted out of the conveyor.

In the manufacture of link chains for conveyors particularly such ones having paths of motion which are disposed in curves in different plane, hitherto difficult problems have been involved to the designers. This is not merely a matter of manufacturing links, which bend in a ductile relation to each other in different plane, but the link should furthermore present a considerable tensile strength, viz. be of a good material apt for hardening, and in addition thereto provide frictional surfaces having a small coefficient of friction. In addition to this the chain should permit safe guiding and exchange of details subjected to wear without encountering too great expenses. It may also be mentioned that in conveyors of this kind it is desirable to avoid a plurality of conveyors operated in a series by means of separate motors. This can only be achieved by reducing the friction between the chain and the guide, viz. by using of such a material which can be given hard and even abutment surfaces, ability reducing the coefficient of friction.

Link chains of the kind just discussed are known in which the link is cast. The chain link may also be made by forging or hammering but these methods require considerable costs for the manufacture of the chain. Hardening of links of cast iron is very expensive and cumbersome since in fact merely decarbonization may come into question. Furthermore in pieces of metal shaped in this way surface structures are obtained, which increase the friction and which according to above make a considerable inconvenience.

Such links also present an engaging surface to sprocket or similar wheels driving or guiding the chain. After a relatively short time such a surface of engagement will get worn, which will result in lash and a wrong pitch for which reason such chains frequently have to be exchanged with considerable difficulties and costs.

Guiding of the chain furthermore occurs through co-operation between the side facings of the links and the walls of a groove which will involve new moments of friction to be overcome by the driving motor and which together with the relatively small strength of each link does not permit the utilization of merely one driving motor in extended conveyors but requires division into a plurality of successive conveyors having each one motor.

The link according to the invention, however, has been designed as a result of failures in using links of the previous kind just discussed and in practice it has proved to be superior to all such constructions not least due to the simplicity in design and manufacture of same. The link according to the invention is thus preferably manufactured of hardenable band steel from store which is at first cut in straight lengths and provided with pin apertures at the ends and with two elongated apertures in the middle portion. Such a semifinished product is then bent similarly to a hair pin with a somewhat rounded bend and diverging legs. When assembling the chain the legs of a link are placed to embrace the bent portion of an adjacent link, in which a drilled through tap is set down, whereupon a pin is slipped through all parts. The pin extends a considerable distance beyond each facing of the link to aid in guiding the chain in a groove in vertical curves.

The above tap may be easily manufactured from hardenable rod material and according to the invention may be profiled in such a way that a soft engagement will be achieved with the sprocket wheels. Such an engaging part, as the tap constitutes, on one hand is more easily hardened than the surface of engagement on the link according to the above discussed link and on the other hand does not require exchange of all the link upon getting worn.

In addition to all that has been previously mentioned it can be mentioned that the band material from which the link according to the invention is manufactured it is extraordinarily easily manufactured and further easily hardened in view of the freeness in the choice of material so that maximal strength is obtained in all links, which permits the construction of extended conveyors of great reliability of service. In other respects such band steel presents narrow edge surfaces which will serve as sliding surfaces in the guides and furthermore a surface of such a structure that a low frictional coefficient is obtained which latter is very important.

The main feature of the invention consists in that each link comprises a length of band material bent into a shape similar to a hair pin and having apertures for a through-going pin in each leg and provided with two elongated apertures in opposed relation to each other in the bent part of the band piece, a tap provided with a diametrically extending pin bore being inserted in said bent part at right angles to the planes of the legs, said tap accommodating the bent portion of the band steel in such a way that the tap may be turned relatively to said part and so that adjacent links are kept together by a pin extending through both legs of one link, the extended apertures of the other link and the tap through the diametrical pin bore, said pin extending beyond the facings of the legs with head-like portions adapted to run in particular guide grooves for the link chain in vertical curves.

The invention also comprises certain other novel features of construction and combinations of parts, essential elements, which are set forth in appended claims, and a preferred form for embodiments, which are hereinafter described with reference to the accompanying drawings. In the drawings:

Fig. 1 is the conveyor in a horizontal curve as viewed in plan.

Fig. 2 is a section on the line A—A in Fig. 1.

Fig. 3 is the conveyor in a vertical curve as viewed from the side.

Fig. 4 is a part of the chain pass as viewed in plan and showing two articulations in section.

Fig 5 is a section on the line B—B in Fig. 4.

Fig. 6 is a chain link as viewed from the side and Fig. 7 the same link as viewed in plan.

Fig. 8 is a detail of the articulation as viewed from the side and Fig. 9 the same detail as viewed in plan.

Fig. 10 is the horizontal pin of the articulation as viewed in plan and Fig. 11 the same bolt as viewed from the side.

In the drawing reference numeral 1 designates the side frame pieces of the conveyor which is shown as shaped with angular cross-section and kept together by cross-beams 2. The latter are provided with U-shaped recesses 3 for each chain of the conveyor, viz. two chains in this case. Placed in the bottom of each recess is a plane steel bar 4 adapted to support the corresponding chain 5. Between both chains 5 is provided on the cross-beams a longitudinally extending flat bar-iron 6, which together with the side frame pieces assists in guiding the chain. The bottom flanges of the side frame pieces 1 and the flat bar-iron 6 are arranged in parallel and protrude somewhat beyond the recesses 3 covering the opening 7.

The chain consists of an articulated link chain. The articulation between two chain links 8 is formed by a tap 9 pivotally journaled in one end of a link 8, which is shaped to form a loop 10. The tap 9 has a hole 11 extending at right angles to the longitudinal direction of the tap, which corresponds to a slot 12 in each side of the loop 10. The other end of the link 8 is open so that the link is forked. In each leg of said fork is a hole 13. Inserted through the hole 13 in one link, the slots 12 in an adjacent link and the hole 11 in the tap 9 is a pin or cross-pin 14. The pin 14 is suitably fixedly arranged in the hole 13, such as by being splined, but pivotally journalled in the slots 12 and the hole 11. The pin 14 has an extension or head 15 on both sides of the link 8, which extension after assembling the chain is preferably given the shape of a semicircle (Fig. 11). The lower, as counted in the feed direction, the front part of the tap 9 has the shape of a sector 16 of a circle adapted to engage a sprocket wheel or the like (not shown in the drawing) serving to drive the chain.

The manner of operation of the device will be apparent from studying the foregoing description. The extensions 15 of the pin 14 serve to guide the chain in concave vertical curves (see Fig. 3) wherein the surface of the extension through the free diameter abuts against the undersides of the guide plates 1. The chain moves in the direction of C to D (Fig. 1). Due to the shape of the chain links solid particles and impurities possibly present are discharged in course of operation through the space which is formed at the quadrantally shaped surfaces 16 and through the openings 7. Thanks to said opening the conveyor is further easy to keep clean by spraying it with water.

Through the construction according to the present invention the links of the chain are mounted in a technically correct manner to permit horizontal and vertical movement thereof.

Having now described the invention, what I claim as new and desire to secure by Letters Patent, is:

1. A slidable link chain comprising a plurality of successively arranged links, each of said links including a bent strip having two spaced, longitudinally extending legs joined together at the end extending in the direction of travel of the chain by a curved head opening rearwardly through a restricted space, the head of each of said successive links being disposed between the free ends of the legs of the preceding link, a first pivot rotatable in said curved head and having a diameter greater than the distance across said restricted space to be retained in said head, said first pivot having a bore extending therethrough normal to the axis of rotation of said pivot in the head, said head having elongated slots therein at diametrically opposed locations and registering with the opposite ends of said bore, said legs of each link having aligned openings therein adjacent their free ends, and a second pivot extending through said bore of the first pivot and said slots and engaging at its opposite ends in said leg openings of the preceding link so that the successive links are swingable relative to each other in two right angularly disposed planes, said second pivot having head portions at the opposite ends thereof extending beyond the legs of the preceding link, said head portions having semi-circular cross-sections so that the curved surfaces of said head portions are slidably engageable with related guides to cause the chain to follow a path defined by the guides.

2. A slidable link chain according to claim 1; wherein one end of said first pivot is sector-shaped for engagement by the teeth of a drive sprocket.

3. A slidable link chain for a toothed-wheel guide comprising successive members which are movable in two directions with respect to each other, each member having an open end and a closed end, the members being positioned so that the open end of each member embraces the closed end of the next successive member; each member including a hairpin shaped band providing the closed and open ends and having bores at the open ends thereof, a peg passing through the bores, the closed end of the hairpin having slots to receive the peg which passes through the bores of the next adjacent member; and a bolt with a diametric bore pivotally positioned at the head end of the hairpin, the peg being positioned in the diametric bore of the bolt, the lower portion of said bolt being a circular section for contacting the toothed wheel of the guide, peg having head-like parts of semi-circular cross section for engaging the guide.

References Cited in the file of this patent

UNITED STATES PATENTS 1,965,285     Gilstad                July 3, 1934

FOREIGN PATENTS 370,306     Great Britain         Apr. 17, 1932